United States Patent

Ban

[15] 3,698,722

[45] Oct. 17, 1972

[54] CONTROL CIRCUIT FOR MULTIPLE TAPE CARTRIDGE PLAYING APPARATUS

[72] Inventor: Itsuki Ban, 829, Higashi-Oizumimachi, Nerima-ku, Tokyo, Japan

[22] Filed: Sept. 21, 1970

[21] Appl. No.: 73,889

[52] U.S. Cl. ............................274/4 F, 179/100.2 Z

[51] Int. Cl. ............................................G11b 23/12

[58] Field of Search...............274/4 F; 242/180, 181, 197–200; 179/100.2 Z, 100.2 MD

[56] References Cited

UNITED STATES PATENTS

| | | | |
|---|---|---|---|
| 3,511,508 | 5/1970 | Ban | 274/4 F |
| 3,584,879 | 6/1971 | Ban | 274/4 F |
| 3,599,987 | 8/1971 | Ban | 274/4 F |

*Primary Examiner*—Leonard Forman
*Assistant Examiner*—Dennis A. Dearing
*Attorney*—Jacobs & Jacobs

[57] ABSTRACT

The multiple tape cartridge playing apparatus comprises a rotatable carriage on which a plurality of endless magnetic tape cartridges mounted and which is rotatably driven to selectively bring one of the cartridges into the play position, a reciprocally movable deck provided with a rotary capstan and a magnetic head for playing the cartridge brought into the play position, and deck driving means for moving the deck between a reproducing position where the capstan and the magnetic head engage the cartridge in the play position and a reproducing position where the capstan and the magnetic head are disengaged from the cartridge. A control circuit for the multiple tape cartridge playing apparatus comprises a cartridge selecting switch group for indexing the cartridge to be played, rotary switching means operable in response to rotation of the carriage, switches actuated by said deck, and solenoids. By operation of one of the switches in the cartridge selecting switch group, said deck is moved from said reproducing position to said retracted position, said carriage being rotated to bring the cartridge indexed by the switch into the play position during the time that said deck is retained in said retracted position, said deck being moved from the retracted position to the reproducing position to initiate the play of the designated cartridge after the cartridge has been brought to the play position.

4 Claims, 5 Drawing Figures

CONTROL CIRCUIT FOR MULTIPLE TAPE CARTRIDGE PLAYING APPARATUS

This invention relates to a multiple tape cartridge playing apparatus, and more particularly to a control circuit for controlling operation of the playing apparatus.

A primary object of the invention is to provide a control circuit for a multiple tape cartridge playing apparatus, which is capable of controlling operation of the player so that the cartridge designated to be played is positively selected under any operative condition of the playing apparatus and is brought to a predetermined play position.

Another object of the invention is to provide a control circuit for a multiple tape cartridge playing apparatus to control operation of the player, wherein there is provided a cartridge selecting switch group having switches corresponding to each of the cartridges for indexing the cartridge to be played, and wherein a deck on which a rotatable capstan and a magnetic head for playing the cartridge is away from the cartridge played in the play position in response to designation of the cartridge to be played upon operation of the switch, the deck being then brought into a predetermined retracted position, the designated cartridge being automatically moved to the play position, the deck being then automatically moved to a reproducing position where the magnetic head engages the cartridge in the play position to initiate the play of the designated cartridge.

A further object of the invention is to provide a control circuit for a multiple tape cartridge player, wherein the deck is automatically moved to the retracted position in response to termination of operation of the player, the capstan being away from a pinch roller within the cartridge in the play position at termanation of operation of the player to prevent deformation of the pinch roller derived from engagement with the capstan when the player is terminated.

Still another object of the invention is to provide a control circuit for a multiple tape cartridge playing apparatus, wherein indication that the cartridge is played is made by lighting of a pilot lamp while rotation of a rotatably movable carriage on which a plurality of cartridges are mounted to bring the designated cartridge into the play position is discriminated by the pilot lamp being on or off.

Further objects and features of the invention will be apparent from the detailed description of preferred embodiments with reference to the accompanying drawings, in which:

DESCRIPTION OF THE PREFERRED EMBODIMENTS

Figure 1:
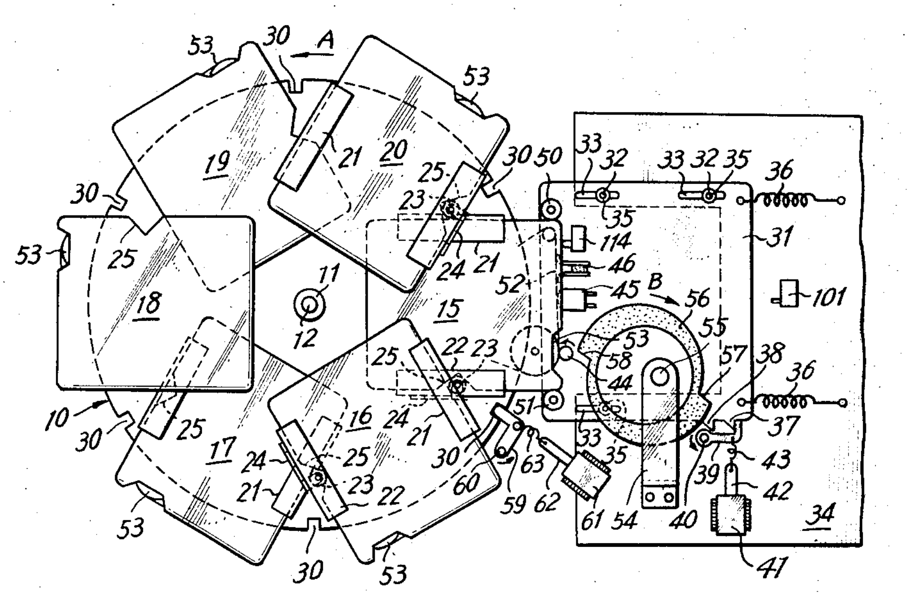
FIG. 1 is a plan view of an embodiment of a multiple tape cartridge playing apparatus to which a control circuit is applied, with portions partially broken away.

A multiple magnetic tape cartridge playing apparatus to which a control circuit is applied according to the present invention includes a rotatable cartridge support carriage 10 for supporting a plurality of endless magnetic tape cartridges. The carriage 10 is of a generally circular shape and mounted at the center thereof to a sleeve 11 through which a shaft 12 extends vertically and upwardly of a horizontal plate 14 in the player housing (not shown). The shaft is also rotatably supported by a suitable bearing 13 provided on the horizontal plate 14 thereunder. The sleeve 11 is so mounted to the shaft 12 that the sleeve is slidable with respect to axial direction of the shaft and fixed with respect to rotational direction thereof. Therefore, the carriage 10 is freely slidable along with the shaft 12 and rotated bodily with the shaft when the shaft is rotated.

Six tape cartridges 15 to 20 are received in and held by holding elements which are provided on a flat surface of the carriage 10. The holding elements each comprise a pair of guide members 21 and 22 each of which is U-shaped configuration in section. One guide member 22 is provided with a retention roller 23 receivable in a notch 25 on the side wall of the cartridge at the free end of a displaceable member 24 which is a leaf spring one end of which is secured by a suitable manner to the side of the guide member. Each of the cartridges 15 to 20 are successively held by the holding elements when the retention roller 23 is received in the notch 25 on the side wall of the cartridge. The holding elements for the cartridges 15–20 are identical, and the holding elements are arranged so that the cartridges 15 to 20 are radially supported on the carriage 10. The guide members for the cartridges 15, 17 and 19 are secured by a suitable manner to the carriage 10 at upper surface thereof. On the other hand, the guide members for the cartridges 16, 18 and 20 are fixed to the other guide members for the cartridges 15, 17 and 19 secured directly to the carriage 10. As a result, the cartridges 15 to 20 are radially spaced from each other to form an angle of 60° at different level and the forward end of the cartridge extends from the carriage.

Figure 2:
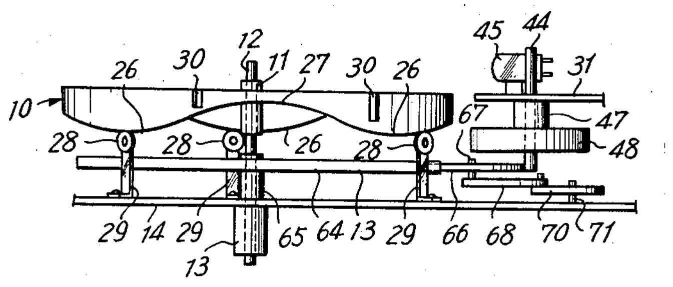
FIG. 2 is an elevational view showing a portion of the player shown in FIG. 1, as viewed from the front thereof.

As seen from FIG. 2, the lower edge of the carriage 10 forms a cam surface having a plurality of convex portions 26 and concave portions 27. The cam surface of the carriage 10 is supported for rotation on three rollers 28 journaled on three circumferentially spaced pillow blocks 29 on the horizontal base plate 14 of the player. The cam surface and the rollers 28 are arranged so that all of the convex portions are on the rollers at one time or all of the concave portions are on the rollers at another time while the other concaves are on the other rollers when one concave is on one of the rollers. Therefore, as will be described later, rotation of the carriage 10 causes itself to move up and down by means of the cam surface and the rollers 28. The convex and concave portions are formed so that the distance that the carriage 10 moves up and down is equal to the difference between the cartridges 15, 17, and 19 and the cartridges 16, 18 and 20. FIG. 1 shows the cartridge 15 held in the predetermined play position, wherein the convex portion 26 is on the rollers 28. From such condition, the carriage 10 is rotated through 60° in the direction of arrow A to bring the cartridge 16 into the play position and at the same time to position the concave portion 27 in the rollers 28. Accordingly, the cartridges 15, 16 are positioned in the play position at the same level. It will be understood that this is also the case with the other cartridges. Whether the cartridges are supported at a different level or the same level has no connection with the present invention, however, if it is desired to support the cartridges at the same level, it is necessary to enlarge the diameter of the carriage. This is not desirable since the player is required to be large dimensioned. Incidentally, where the cartridges are supported on the carriage at the same level, it is not necessary to move up and down the carriage when rotated. Six slots 30 are equally spaced to one another at the periphery of the carriage 10 and operation of the slots will be described later.

Numeral 31 is a deck which is slidably supported by guide rods 32 that pass through elongated slots 33 formed in the deck and mounted to a plate 34 provided within the player housing. Upward and downward movement of the deck 31 is limited by rings 35 mounted to the rods 32. On the other hand, the deck 31 is intended to be rightwardly moved by tension springs 36. As shown, the deck 31 is shown as being held in a reproducing position against the bias of the springs 36 since a first hook portion 37 of the deck 31 is engaged by a latch lever 39 pivoted to an axis 40 on the plate 34. The latch lever 39 is given a rotational force in the direction of the arrow as shown by a spring (not shown) and movement of the latch lever is limited in a position to have engageable relationship with the hook portion 37 as the latch lever is connected through a connecting spring 43 with a plunger 42 of a solenoid 41 attached to the plate 34.

Provided to the deck 31 are a capstan 44 for playing the cartridge in the play position, a magnetic head 45, and an endmark detector 46 for controlling operation of magnetic head shift means (not shown since this forms not part of the present invention) for changing over the record tracks of the magnetic tape within the cartridge to be played by shifting the magnetic head 45. The capstan 44 is rotatably supported by a suitable bearing 47 (FIG. 2) mounted to the deck 31 and upwardly extends through a hole (not shown) bored through the deck. The capstan 44 is rotatably driven in the direction of the arrow as shown by capstan driving means which comprises a flywheel 48 (FIG. 2) attached to the capstan, and a motor 49 (FIG. 4) mounted to the deck thereunder for rotating the flywheel through a belt (not shown). In addition to the capstan 44 and the magnetic head 45, there are provided on the deck 31 guides 50, 51 for securing relative position of the cartridge in the play position with respect to the deck. When the deck 31 is in the reproducing position, the capstan 44 abuts against a pinch roller 53 stored in the cartridge in the play position and an endless magnetic tape 52 is drivingly transported across the magnetic head 45, as well known, by coaction of the capstan 44 with the pinch roller 53.

The multiple tape cartridge playing apparatus includes deck driving means for slidably moving the deck 31 between the reproducing position and a retracted position where the capstan is disengaged from the pinch roller 53 within the cartridge in the play position. The deck driving means has a rubber covered eccentric cam wheel 56 rotatably supported by an axis 55 attached to the other end of a support member 54 one end of which is secured to the plate 34. Step portions 57, 58 are respectively formed at the periphery of the cam wheel 56 so as to allow the surfaces thereof to be in alignment with each other. The cam wheel 56 as will be fully described later is provided to abut against the capstan 44 so as to allow it to abut against the capstan and to be rotated in the direction of arrow B. When the deck 31 is retained in the reproducing position upon engagement of the hook portion 37 with the latch lever 39, the cam wheel 56 is regulated by the step portion 58 and keeps away from the capstan 44. If the latch lever 39 is moved to disengage from the hook portion 37 by energization of the solenoid 41 due to a control means, the deck 31 is rightwardly slided from the reproducing position by the bias of the tension springs 36. This causes the capstan 44 to abut against the cam wheel 56 to rotatably drive the latter in the direction of arrow B. The deck 31 is gradually and rightwardly moved under control of rotation of the cam wheel 56 at this moment. The cam wheel 56 is rotated through a half revolution to allow the step portion 57 to pass over the capstan 44, and the solenoid 41 has been already energized to return the latch lever 39 to its original position. And, the latch lever 39 is engaged by the other hook portion 38 of the deck 31 to prevent movement of the deck 31 and to hold the deck in the retracted position. Thereafter, when the solenoid 41 is energized again to move the latch lever 39 establish disengagement from the hook portion 38, the deck 31 is regulated by the step portion 57 and slides from the retracted position by the bias of the tension springs 36 until the capstan 44 abuts against the cam wheel 56. When the cam wheel 56 is again rotated by the capstan 44, the deck 31 is gradually and leftwardly moved against the bias of the tension spring 36 with rotation of the cam wheel 56. The cam wheel 56 is rotated to a position where the maximum eccentric position comes in contact with the capstan 44 to move the deck 31 leftwardly to the reproducing position. The cam wheel 56 is entirely rotated through one revolution from the initial position shown in FIG. 1 to allow the step portion 58 to pass through the capstan 44. At this moment, the deck 31 is slightly and rightwardly moved by the bias of the tension spring 36 while the latch lever 39 which has been returned to its original position is engaged by the hook portion 37 and retained in the reproducing position at the same time the wheel 56 is disengaged from abutment with the capstan 44.

When the deck 31 is moved from the play position to the retracted position by the deck driving means, the capstan 44, the magnetic head 45, and the endmark detector 46 are away from the cartridge in the play position to stop the play of the cartridge and the guide members 50, 51 are also away from the cartridge.

A L-shaped latch lever 59 is pivoted to an axis 60 provided to a suitable support member (not shown) within the player housing. The latch lever 59 is adapted to engage the slot 30 of the carriage 10 to hold one of the cartridges in the play position where free rotation of the carriage is prevented. The latch lever 59 is normally urged in the direction of the arrow as shown by a spring (not shown) to engage the slot 30. The latch lever 59 is connected through a connecting spring 63 to a plunger 62 of a solenoid 61 fixed to the plate 34 and is away from the slot 30 to permit of free rotation of the carriage 10 when the solenoid 61 is energized. The solenoid 61 as will be described later, is adapted to establish energization upon movement of the deck to the retracted position.

Figure 3:
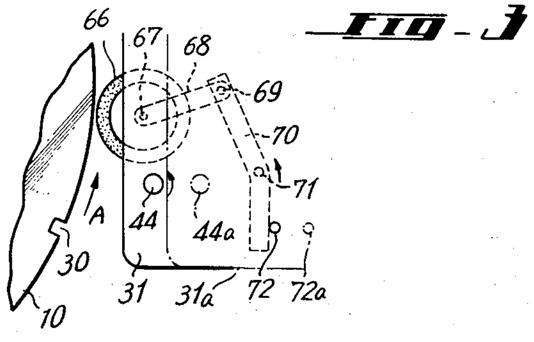
FIG. 3 is a representation schematically showing carriage driving means for rotatably driving the carriage in FIG. 1.

Referring to FIG. 2 and 3, there is shown carriage driving means for rotatably driving the carriage 10 to exchange the cartridge to be played.

The carriage driving means includes a disk 64 a center of which is fixed by a sleeve 65 to the shaft 12. A swingable lever 70 is pivotally mounted to an axis 71 on the base plate 14. A lever 68 has one end pivotally connected by a pin 69 to a the swingable lever 70 and the other end carrying an axis 67 by which an idler wheel 66 is so supported to be at the same level as disk 64. The swingable lever 70 is normally biased in the direction of the arrow as shown by a spring (not shown), and movement of the lever 70 is limited by a stopper pin 72 downwardly extending from the deck 31. If the deck 31 is in the reproducing position, the idler wheel 66 is positioned away from the disk 64 and the capstan 44 as seen from FIG. 3. When the deck 31 is moved to the retracted position to assume the position indicated by **31*a*, the stopper pin 72 also assume the position 72*a* to move the swingable lever 70 in the direction of the arrow as shown. Pivotal movement of the lever 70 allows the idler wheel to interpose between the disk 64 and the lower end of the capstan which is moved to the position 44*a* and rotation of the capstan 44 is imparted through the idler wheel 66 to the disk 64 to rotatably drive the same. At this time, if the latch lever 59 is moved to the position escaping out of the slot 30 by the solenoid 61, the carriage 10 is rotatably driven in the direction of arrow A as the disk 64 is rotated. If during the time that the carriage 10 is rotated, the solenoid 61 is deenergized, the latch lever 59 will engage with the slot 30 whereby rotation of the carriage 10 and disk 64 is prevented to position one of the cartridges in the play position. Prevention of rotation of the disk 64 allows the idler wheel 66 to slip off the disk 64 and then the idler wheel 66 is moved away from the capstan 44 and the disk 64 upon movement of the deck 31** to the reproducing position, as seen from FIG. 3.

Figure 4:
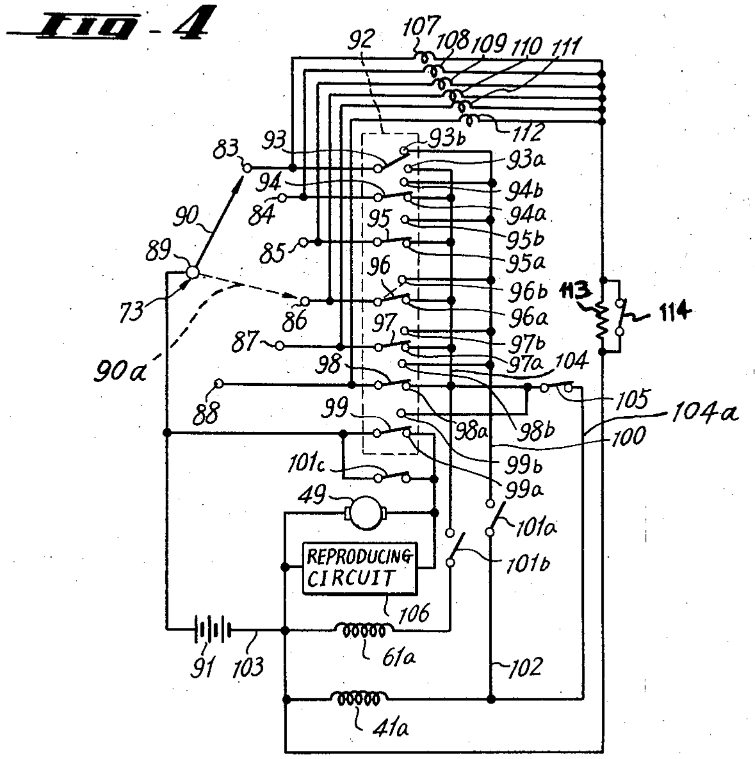
FIG. 4 is a representation schematically showing the control circuit of the invention for the player in FIG. 1.
Figure 5:
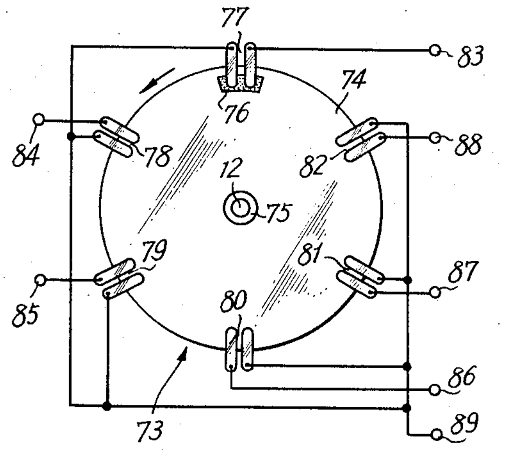
FIG. 5 is an explanatory view of the rotary switching means shown in FIG. 4.

FIG. 4 shows a control circuit of the invention for the player, which includes a rotary switching means 73 fully illustrated in FIG. 5. The rotary switching means 73 includes an insulated rotary disk 74 tightly mounted by a sleeve 75 to the shaft 12 at the lower end thereof so as to synchronously rotate with the carriage 10. A conductive piece 76 is provided to the rotary disk 74 at the upper surface thereof. Switches 77 to 82 each consisting of a pair of contacts are mounted on a fixed member (not shown) of insulation, which is provided corresponding to the rotary disk 74. The switches 77 to 82 are spaced 60° apart from one another and are successively closed by the conductive piece 76 due to rotation of rotary disk 74 as the shaft 12 is rotated. One of the pair of contacts for the switches 77 to 82 are each connected to terminals 83 to 88 and the other is connected to a common terminal 89. In FIG. 4, these terminals 83 to 88 and the common terminal 89 are shown while the conductive piece 76 is shown as a movable contact 90. The movable contact 90 is shown as being disposed between the terminal 83 and the common terminal 89, and this means that the conductive piece 76 is positioned to close the switch 77 as shown in FIG. 5. The common terminal 89 is connected to a plus terminal of an electrical power source for the player, and the terminals 83 to 88 are each connected to switches 93 to 98 for the cartridge selecting switch group as designated by numeral 92. The cartridge selecting switch group 92 includes another switch 99 in addition to the switches 93 to 98. The switches 93 to 99 include first stable positions closed by the contacts **93*a* to 99*a* and second stable positions closed by the contacts 93*b* to 99*b*. Each of the switches 93 to 99 has a pushbutton (not shown) and is changed over from the first stable position to the second stable position when the pushbutton is depressed. The switches 93 to 99 are designed to have such a relationship that when one of the switches 93 to 99 is changed over to the second stable position the remainder assume the first stable position. FIG. 4 shows that the switch 93 is in the second stable position whereas the switches 94 to 99** are in the first stable position.

The contacts **93*b* to 98*b* for the switches are connected to the minus terminal of the power source 91 via a common lead 100, switch 101*a*, a lead 102, and exciting coil 41*a* of the solenoid 41, and a lead 103. The contacts 93*a* to 98*a* for the switches and the contact 99*b* are connected to the lead 102 through a common lead 104, a switch 105 and lead 104*a* and also connected to the minus terminal of the power source 91 through a switch 101*b*, an exciting coil 61*a*, and the lead 103. The motor 49 for driving the capstan 44 and a reproducing circuit 106 are connected in series with the power source through a parallel connection between the first stable position of the switch 99 and a switch 101*c*. Pilot lamps 107 to 112 connected in series with the terminals 83 to 88 are connected in series with the power source 91 through a parallel connection between a resistor 113 and a switch 114, and the rotary switching means 73. As seen from FIG. 1, the switches 101*a*, 101*b*, and 101*c* are stored within a micro switch 101 provided to the plate 34. The micro switch 101 is adapted to be actuated when the deck 31 is moved to the retracted position. Where the deck 31 is in the reproducing position and the micro switch 101 is deactuated, the switches 101*a* and 101*b* are opened whereas the switch 101*c* is closed. If the micro switch 101 is actuated, the switches 101*a*, 101*b* and 101*c* are in a reversed position. The switch 105 not shown in FIG. 1 is actually provided to the plate 34 to be actuated by a portion of the deck 31 moved to the reproducing position and is closed when actuated, and is opened when the deck 31 is retracted from the reproducing position to establish its deactuation. The switch 114 is mounted to the deck 31 and actuated by the forward edge of the cartridge in the play position when the deck 31 is in the reproducing position. It will be understood from this that the switch 114** is adapted to be opened or closed when deactuated or actuated.

Operation of the player will be apparent from the following description.

FIG. 4 shows that the cartridge selecting switch 93 is changed over to the second stable position and the cartridge 15 corresponding to the switch 93 is being played. At this status, the pilot lamp 107 is lit by the power source 91 through the rotary switch 73 and the switch 114 while the cartridge 15 is in the play position and the deck 31 is in the reproducing position to thus indicate that the cartridge is played.

In substitution for the cartridge 15, to play the cartridge 18, the cartridge selecting switch 96 corresponding to the cartridge 18 is operated to change over the switch 96 to the second stable position as shown by the dotted line and at the same time the switch 93 is changed over to the first stable position. In response to changeover of the switch 93, the current is applied from the power source 91 to the exciting coil 41*a* of the solenoid 41 via the switch 77 of the rotary switch 73, the switch 93, and the switch 105 to allow the solenoid 41 to move the latch lever 39 to establish disengagement from the hook portion 37. As a result, the deck 31 as described hereinbefore is moved from the reproducing position to the rightward by coaction of the tension springs 36 and the deck moving means. In response to movement of the deck 31 from the reproducing position, the switch 105 which has been actuated by the deck 31 is opened upon deactuation and the solenoid 41 is not supplied with the current from the power source 91. Accordingly, the deck 31 as above mentioned is retained in the retracted position by engagement of the hook portion 38 with the latch lever 39. On the other hand, in response to movement of the deck 31 from the reproducing position, the capstan 44, and the magnetic head 45 are retracted from the cartridge 15 in the play position to stop the play thereof. And, the switch 114 is deactuated and thus opened to apply a weak current from the power source 91 through the resistor 113 to the pilot lamp 107 to lessen its brightness indicating that the player does not play the cartridge. When the deck 31 is retained in the retracted position, the micro switch 101 is actuated by the deck 31 and the switches 101*a*, 101*b* and 101*c* are changed over to the position reversed to that shown in FIG. 4. Upon closing the switch 101*b*, the current from the power source 91 is applied to the exciting coil 61*a* of the solenoid 61 via the conductive piece 76 of the rotary switch 73, the switch 93 in the first stable position, and the switch 101*b* to allow the solenoid 61 to actuate to allow the latch lever 59 to escape from the slot 30 of the carriage 10. Consequently, the carriage 10 is disengaged from its retention and is rotated in the direction of arrow A by the carriage driving means as above described. As the carriage 10 is rotated, the switches 78, 79 for the rotary switch 73 are successively closed by the conductive piece 76 at which time the deck 31 is retained in the retracted position so as not to prevent rotation of the carriage 10. If the carriage 10 is rotated until the cartridge 18 corresponding to the cartridge selecting switch 96 is brought into the play position, the switch 80 of the rotary switch 73 is closed by the conductive piece 76 (That is, the movable contact 90 assumes the position 90*a* as indicated by the doted line in FIG. 4) and since the switch 96 was changed over to the second stable position (shown in dotted line in FIG. 4) the current supply to the solenoid 61 is cut off while applying the current supply to the solenoid 41. The break in the current supply to the solenoid 61 causes the latch lever 59 engages the slot 30 at the position where the cartridge 18 is brought into the play position to thus prevent rotation of the carriage 10. On the other hand, the solenoid 41 is supplied with the current to move the latch lever 39 to establish disengagement from the hook portion 38 at the same time the deck 31 is moved from the retracted position and is then gradually brought, as above described, into the reproducing position under the influence of the deck driving means. As the deck 31 is moved away from the reproducing position, the micro switch 101 is deactuated to open the switches 101*a* and 101*b* while closing the switch 101*c*. In response to opening of the switch 101*a*, the solenoid 41 is no longer supplied with the current from the power source 91. Thus, the latch lever 39 is returned to its initial position to engage the hook portion 37. The deck 31 is moved to the reproducing position by the deck driving means and then is retained by engagement of the latch lever 39 with the hook portion 37, and the switch 105 is actuated by the deck 31 and thereby closed. Since the switch 96 is in the second position, the solenoid 41 is not supplied with the current even if the switch 105 is closed. By movement of the deck 31 to the reproducing position and retention thereof, the capstan 44 and the magnetic head 45 engage the cartridge 18 in the play play position to initiate the play of the cartridge 18. The play of the cartridge 18 is indicated by brightly lighting of the pilot lamp 110 upon actuation of tee switch 114 by the cartridge to close the switch 114. If the cartridge 18 is not placed on the carriage 10, the switch 114 is not actuated and is kept open to weakly light the pilot lamp 110 since a weak current is applied from the power source 91 thereto via the resistor 113. More specifically, the pilot lamps 107 to 112 may be brightly lit only when there is a cartridge to be played.

From the foregoing, it will be understood that the cartridge to be played is designated by operating any of the cartridge selecting switches 93 to 98 whereby the designated cartridge is automatically brought into the play position and thus played.

The switch 99 is operated to establish deactuation of the player so that, when the switch 99 assumes the second stable position, the solenoid 41 is energized and the deck 31 is moved from the reproducing position to the retracted position. Upon movement of the deck 31 to the retracted position, the micro switch 101 is actuated by the deck 31 to close the switches 101*a*, 101*b* while opening the switch 101*c*. If the switch 101*c* is opened upon changeover of the switch to the second stable position, the motor 49 and the reproducing circuit 106 are not supplied with the current from the power source 91 and are non-operative position. Closing of the switch 101*b* energizes the solenoid 61 to escape allow the latch lever 59 to escape the slot 30 to thus permit rotation of the carriage 10. Accordingly, the carriage 10 is slightly rotated the carriage driving means due to rotation of the capstan 44 which is kept rotating for a while with inertia after break in the current supply to the motor 49. Since the disk 74 of the rotary switch 73 is rotated with the carriage 10, none of the switches 77 to 83 are closed by the conductive piece 76 on the disk 74. The solenoid 61 is not supplied with the current, and all the pilot lamps 107 to 112 are not supplied with the current from the power source 91. On the other hand, the solenoid 41 is not supplied with the current since the switch 105 is opened in response to movement of the deck 31 from the reproducing position. In other words, by changeover of the switch 99 to the second stable position, actuation of the player is terminated where the deck 31 is retained in the retracted position. At termination of actuation of the player, the deck 31 is in the retracted position whereas the capstan 44 is away from the pinch roller 53 of the cartridge in the play position so that deformation of the pinch roller 53 derived from engagement of the capstan with the pinch roller for a long period can be prevented.

It will be understood that, for operation of the player again, the cartridge selecting switch corresponding to the cartridge desired to be played is operated whereby the switch 99 assumes the first stable position and the motor 49 and the reproducing circuit 106 initiate their operation as supplied with the current from the power source 91 to allow each member to initiate their operation as mentioned above.

It is to be under stood that the embodiments of the invention which has been described are merely illustrative of the principal of the invention. Numerous modifications may be made without departing from the true spirit and scope of the invention.

What is claimed is:

1. In a multiple tape cartridge playing apparatus having a rotatable carriage on which a plurality of endless magnetic tape cartridges are mounted, carriage driving means for rotatably driving said carriage, carriage latch means for preventing rotation of said carriage to selectively position a cartridge in a predetermined play position, a reciprocally movable deck, a rotatable capstan on said deck and adapted to abut against a pinch roller within the cartridge in the play position, a magnetic head on said deck, deck latch means for retaining said deck in a predetermined reproducing position where said capstan engages the cartridge in the play position and in a predetermined retracted position where said capstan is disengaged from the cartridge in the play position, and deck driving means for reciprocally moving said deck between the reproducing position and the retracted position in response to disengagement of said latch means from said deck, the improvement which comprises a control circuit for controlling operation of the playing apparatus comprising an electrical power source for said playing apparatus; rotary switching means having a plurality of switches corresponding in number to the number of the cartridges mounted on said carriage, said switching means being operable to close said switches successively in response to rotation of said carriage, one of the switches in said switching means being closed and the remainder being opened when said carriage moves one cartridge to the play position; a cartridge selecting switch group for designating the cartridge to be played and having a plurality of manually operated switches correspondingly connected in series with said switches of said rotary switching means, each of said manually operated switches having a first and a second selectively closed stable position, said manually operated switches having a relationship so that when one is manually operated to be in the second stable position the remainder assume the first stable position; a first switch connected in series with the manually operated switches in the first stable position, said first switch being adapted to be actuated and closed by said deck when said deck is in said reproducing position; a second switch connected in series with said manually operated switches in the second stable position, said second switch being adapted to be actuated and closed by said deck when said deck is in said retracted position; a first solenoid for controlling operation of said deck latch means, said first solenoid being connected through said rotary switching means, said cartridge selecting switch group, and said first switch to the power source, said first solenoid being also connected through said rotary switching means, said cartridge selecting switch group, and said second switch to the power source; a third switch connected in series with said manually operated switches in the first stable position and said cartridge selecting switch group, said third switch being adapted to be actuated and closed by said deck when said deck is in the retracted position; a second solenoid for controlling operation of said carriage latch means, said second solenoid being connected through said rotary switching means, said cartridge selecting switch group and said third switch to said power source, said control circuit being operable to cause said deck to move from said reproducing position to said retracted position by operating one of said manually operated switches of said cartridge selecting switch group, said carriage being rotatably driven upon operation of said manually operated switch to bring the designated cartridge in the play position during the time that said deck is retained in said retracted position, said deck being moved from the retracted position to the reproducing position after the designated cartridge is brought to the play position to initiate the play of the designated cartridge.

2. Apparatus in accordance with claim 1 wherein said cartridge selecting switch group includes a stop switch, said stop switch including a first stable position and a second stable position similar to said manually operated switches, a motor for rotatably driving said capstan and a reproducing circuit for the playing apparatus connected in parallel to each other and in series with said stop switch and said power source, a fourth switch being actuated and closed in response to movement of said deck to said retracted position, said fourth switch being connected in parallel with said stop switch and being connected in series with said first switch, said first solenoid, and said power source, operation of the stop switch being operable to cause said deck to move to said retracted position and to deenergize the motor and the reproducing circuit to terminate operation of the playing apparatus.

3. A control circuit in accordance with claim 2 wherein a plurality of pilot lamps are connected in series with said switches of said rotary switching means and said power source, the pilot lamp corresponding to the cartridge brought to said play position being supplied with the current and lit by said power source.

4. A control circuit in accordance with claim 3 wherein a fifth switch is provided on said deck and is operable to be closed by the cartridge in the play position, and a parallel connection of said fifth switch and a resistor between said pilot lamps and said power source, the current from the power source to the pilot lamp being reduced to weakly light the lamp when the cartridge is not placed in the play position.

* * * * *

PO-1050
(5/69)

UNITED STATES PATENT OFFICE
CERTIFICATE OF CORRECTION

Patent No. 3,698,722 Dated October 17, 1972

Inventor(s) Itsuki Ban

It is certified that error appears in the above-identified patent and that said Letters Patent are hereby corrected as shown below:

In the heading of the patent, insert -- Claims priority from Japanese Patent Application 1969-74620, filed in Japan September 22, 1969. --

Signed and sealed this 6th day of March 1973.

(SEAL)
Attest:

EDWARD M.FLETCHER,JR.
Attesting Officer

ROBERT GOTTSCHALK
Commissioner of Patents